US012696281B2

(12) United States Patent
Deghel et al.

(10) Patent No.: US 12,696,281 B2
(45) Date of Patent: Jul. 28, 2026

(54) INDICATING A TRANSMISSION CONFIGURATION INDICATOR STATE

(71) Applicant: NOKIA TECHNOLOGIES OY, Espoo (FI)

(72) Inventors: Matha Deghel, Montrouge (FR); Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/927,348

(22) Filed: Oct. 25, 2024

(65) Prior Publication Data

US 2025/0048372 A1 Feb. 6, 2025

Related U.S. Application Data

(63) Continuation of application No. PCT/EP2023/060244, filed on Apr. 20, 2023.

(30) Foreign Application Priority Data

May 6, 2022 (FI) ..................................... 20225397

(51) Int. Cl.
| | |
|---|---|
| *H04W 72/02* | (2009.01) |
| *H04L 5/00* | (2006.01) |
| *H04W 72/21* | (2023.01) |

(52) U.S. Cl.
CPC ........... *H04W 72/21* (2023.01); *H04L 5/0094* (2013.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS

| | | |
|---|---|---|
| 2014/0219202 A1 | 8/2014 | Kim et al. |
| 2020/0119778 A1 | 4/2020 | Grant et al. |

(Continued)

FOREIGN PATENT DOCUMENTS

| | | |
|---|---|---|
| EP | 3734888 A1 | 11/2020 |
| EP | 4461057 A1 | 11/2024 |

(Continued)

OTHER PUBLICATIONS

"3rd Generation Partnership Project; Technical Specification Group Radio Access Network; NR; Physical layer procedures for control (Release 17)", 3GPP TS 38.213 v17.1.0, (Mar. 2022), 245 pages.
(Continued)

*Primary Examiner* — Bo Hui A Zhu
(74) *Attorney, Agent, or Firm* — ALSTON & BIRD LLP

(57) ABSTRACT

Disclosed is a method comprising receiving a first information element indicating two transmission configuration indicator (TCI) states, receive a configuration, and determining an association between the two indicated TCI states and at least one physical uplink control channel resource group according to the configuration. The configuration causes the apparatus to determine the association between the two indicated TCI states and the at least one physical uplink control channel resource group to be one of the following: both of the two indicated TCI states are applicable to the at least one physical uplink control channel resource group; a first indicated TCI state of the two indicated TCI states is applicable to the at least one physical uplink control channel resource group; or a second indicated TCI state of the two indicated TCI states is applicable to the at least one physical uplink control channel resource group.

16 Claims, 5 Drawing Sheets

S1 — Receive a first information element, wherein the first information element indicates at least one transmission configuration indicator state.

S2 — Receive a second information element.

S3 — Determine, based on the second information element, an association between the at least one transmission configuration indicator state and at least one physical uplink control channel resource group.

(58) Field of Classification Search

CPC ..... H04W 72/50; H04W 72/51; H04W 72/52; H04W 72/53; H04W 72/54; H04W 72/541; H04W 72/542; H04W 72/543; H04W 72/56

See application file for complete search history.

(56) References Cited

U.S. PATENT DOCUMENTS

| | | | |
|---|---|---|---|
| 2021/0029708 A1 | 1/2021 | Khoshnevisan et al. | |
| 2022/0061076 A1 | 2/2022 | Ma et al. | |
| 2022/0123872 A1 | 4/2022 | Zhang et al. | |
| 2022/0141819 A1 | 5/2022 | Yang | |
| 2023/0140695 A1 | 5/2023 | Matsumura et al. | |
| 2024/0040564 A1* | 2/2024 | Cirik | H04L 5/0023 |
| 2025/0089036 A1 | 3/2025 | Ling et al. | |
| 2025/0089068 A1* | 3/2025 | Matsumura | H04W 28/06 |

FOREIGN PATENT DOCUMENTS

| | | | |
|---|---|---|---|
| KR | 10-2014-0057335 A | 5/2014 | |
| KR | 10-2020-0134282 A | 12/2020 | |
| KR | 10-2021-0148357 A | 12/2021 | |
| KR | 10-2022-0002329 A | 1/2022 | |
| KR | 10-2022-0038412 A | 3/2022 | |
| WO | 2020/225081 A1 | 11/2020 | |
| WO | WO 2020/220230 A1 | 11/2020 | |
| WO | WO 2020/231834 A1 | 11/2020 | |
| WO | WO 2021/070374 A1 | 4/2021 | |
| WO | 2021/156826 A1 | 8/2021 | |
| WO | 2021/212456 A1 | 10/2021 | |
| WO | 2022/015595 A1 | 1/2022 | |
| WO | 2022/216656 A1 | 10/2022 | |
| WO | 2023/130346 A1 | 7/2023 | |
| WO | 2023/132072 A1 | 7/2023 | |

OTHER PUBLICATIONS

"3rd Generation Partnership Project; Technical Specification Group Radio Access Network; NR; Radio Resource Control (RRC) protocol specification (Release 17)", 3GPP TS 38.331 v17.0.0, (Mar. 2022), 1221 pages.

International Search Report and Written Opinion for Patent Cooperation Treaty Application No. PCT/EP2023/060244 dated Jul. 20, 2023, 10 pages.

NTT Docomo, Inc., "Discussion on multi-beam enhancement", 3GPP TSG RAN WG1 #98bis, R1-1911185, (Oct. 14-20, 2019), 20 pages.

Office Action for Finland Application No. 20225397 dated May 8, 2023, 9 pages.

Office Action for Finland Application No. 20225397 dated Sep. 30, 2022, 7 pages.

Samsung, "New WID: MIMO Evolution for Downlink and Uplink", 3GPP TSG RAN Meeting #94e, RP-213598, (Dec. 6-17, 2021), 6 pages.

Catt, "On unified TCI framework extension for multi-TRP operation", 3GPP TSG RAN WG1 #109-e, R1-2203441, (May 9-20, 2022), 10 pages.

Nokia et al., "Unified TCI framework extension for multi-TRP", 3GPP TSG RAN WG1 #109, R1-2204538, (May 9-20, 2022), 28 pages.

Office Action for Vietnamese Application No. 1-2024-08959 dated Mar. 6, 2025, 3 pages.

Decision to Grant for ARIPO Application No. AP/P/2024/016115 dated Nov. 14, 2025, 40 pages.

Office Action for Canadian Application No. 3,251,500 dated Nov. 20, 2025, 6 pages.

Examination Report for Australian Application No. 2023264195 dated Aug. 8, 2025, 3 pages.

Nokia et al., "Unified TCI framework extension for multi-TRP", 3GPP TSG RAN WG1 #112bis-e, R1-2303005, (Apr. 17-26, 2023), 31 pages.

Notice of Reasons for Refusal for Japanese Application No. 2024-565130 dated Nov. 4, 2025, 7 pages.

Samsung, "Multi-beam enhancements", 3GPP TSG RAN WG1 #104b-e, R1-2103221, (Apr. 12-20, 2021), 21 pages.

Zte, "Further details on Multi-beam and Multi-TRP operation", 3GPP TSG RAN WG1 Meeting #107-e, R1-2110955, (Nov. 11-19, 2021), 16 pages.

Intention to Grant for European Application No. 23721841.7 dated Sep. 12, 2025, 43 pages.

Notice of Acceptance for Australian Application No. 2023264195 dated Jan. 16, 2026, 3 pages.

Decision to Grant for Japanese Application No. 2024-565130 dated Feb. 16, 2026, 5 pages.

Notice of Allowance for Korean Application No. 10-2024-7039924 dated Apr. 3, 2026, 4 pages.

Search Report and Written Opinion for Singapore Application No. 11202407750Y dated Mar. 20, 2026, 12 pages.

* cited by examiner

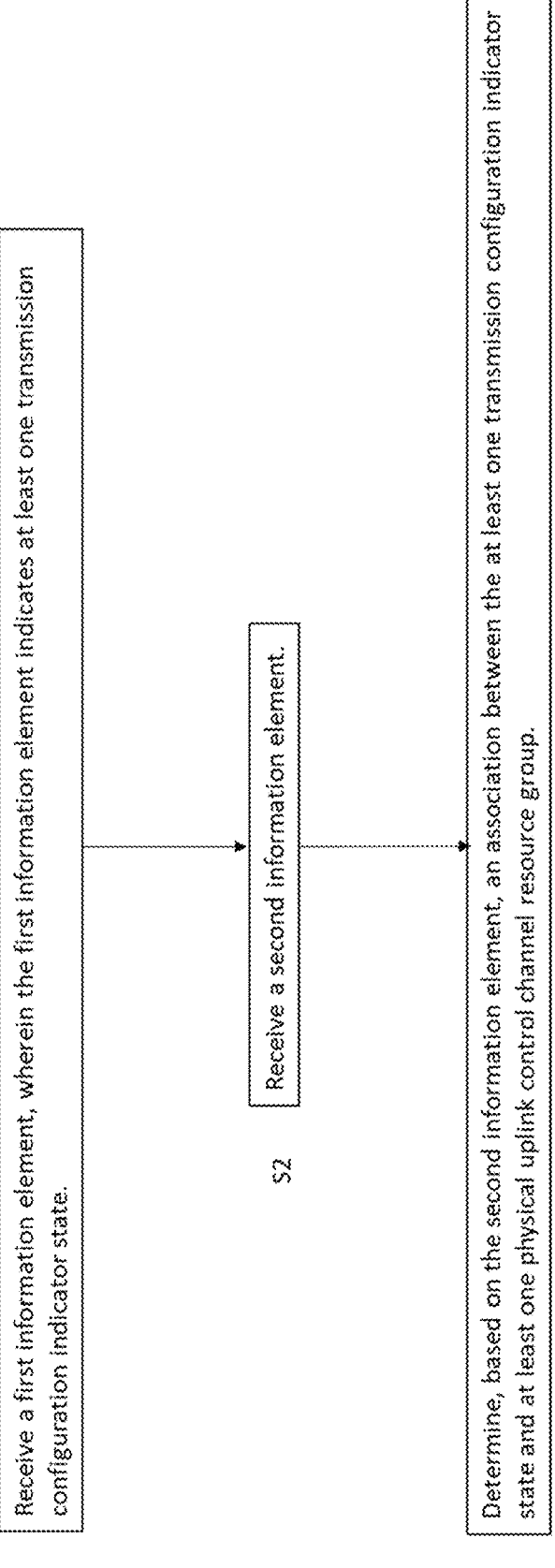

S1 — Receive a first information element, wherein the first information element indicates at least one transmission configuration indicator state.

S2 — Receive a second information element.

S3 — Determine, based on the second information element, an association between the at least one transmission configuration indicator state and at least one physical uplink control channel resource group.

FIG. 2

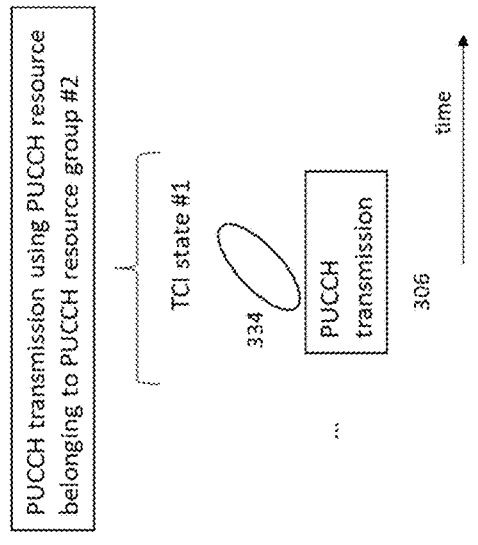
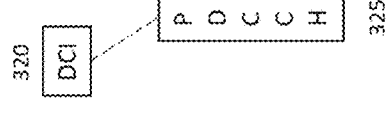
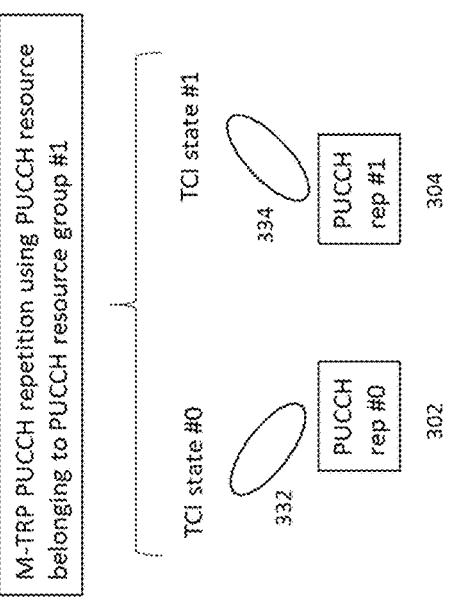
FIG. 3A

Figure 3B:
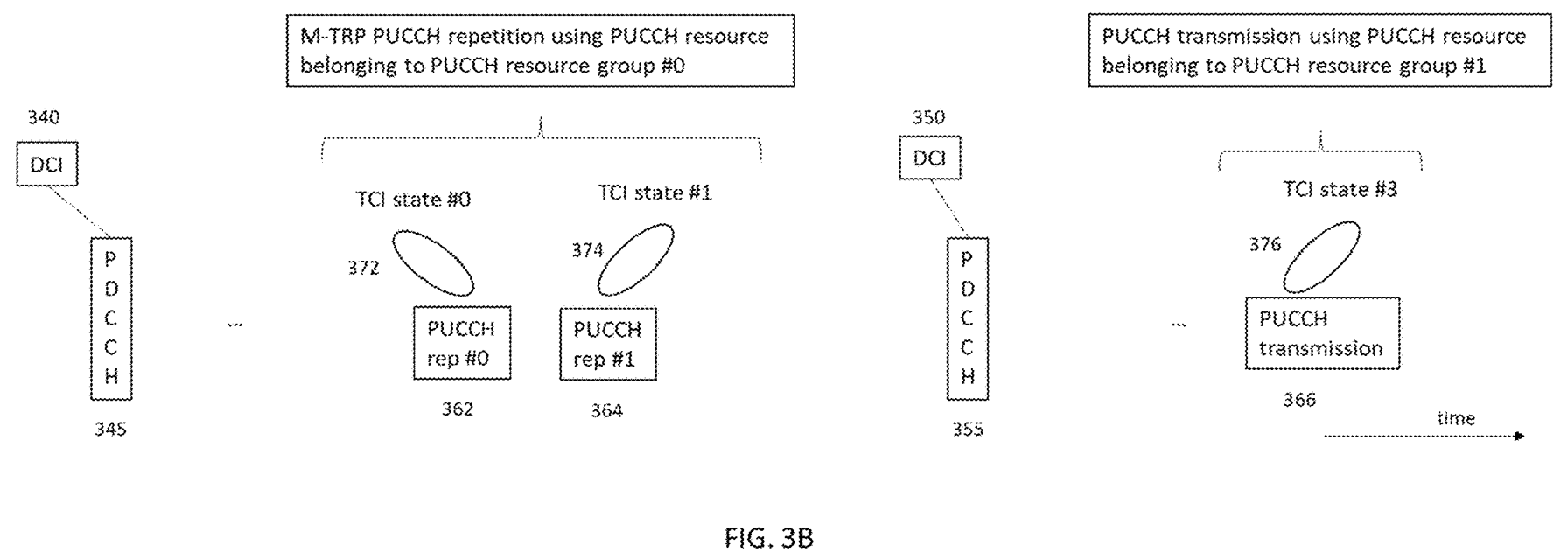

PUCCH transmission using PUCCH resource belonging to PUCCH resource group #1

TCI state #3

376

PUCCH transmission

366

350 DCI

P D C C H

355

M-TRP PUCCH repetition using PUCCH resource belonging to PUCCH resource group #0

TCI state #0

372

PUCCH rep #0

362

TCI state #1

374

PUCCH rep #1

364

340 DCI

P D C C H

345 time

420 Memory

430 Input

410 Processor

440 Output

450 Connectivity

500

530
Communication Interface
TX/RX

510
Communication Control

520
Memory

522
Computer Program
Code

540
Scheduler

INDICATING A TRANSMISSION CONFIGURATION INDICATOR STATE

RELATED APPLICATION

This application claims the benefit of PCT Application No. PCT/EP2023/060244, filed on Apr. 20, 2023, which claims priority from Finnish Application No. 20225397, filed on May 6, 2022, each of which is incorporated herein by reference in its entirety.

FIELD

The following exemplary embodiments relate to wireless communication and to indicating resources associated with transmission of data.

BACKGROUND

Wireless networks, such as cellular communication networks, use control channels to for example indicate control information. Such control information may allow resources to be allocated such that data transmissions are enabled. It is also desirable to have as optimal usage of resources as possible.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to:

receive a first information element indicating two transmission configuration indicator states;

receive a configuration; and determine an association between the two indicated transmission configuration indicator states and at least one physical uplink control channel resource group according to the configuration, wherein the configuration causes the apparatus to determine the association between the two indicated transmission configuration indicator states and the at least one physical uplink control channel resource group to be one of the following:

both of the two indicated transmission configuration indicator states are applicable to the at least one physical uplink control channel resource group;

a first indicated transmission configuration indicator state of the two indicated transmission configuration indicator states is applicable to the at least one physical uplink control channel resource group; or a second indicated transmission configuration indicator state of the two indicated transmission configuration indicator states is applicable to the at least one physical uplink control channel resource group.

According to a second aspect there is provided an apparatus comprising:

means for receiving a first information element indicating two transmission configuration indicator states;

means for receiving a configuration; and means for determining an association between the two indicated transmission configuration indicator states and at least one physical uplink control channel resource group according to the configuration, wherein the configuration causes the apparatus to determine the association between the two indicated transmission configuration indicator states and the at least one physical uplink control channel resource group to be one of the following:

both of the two indicated transmission configuration indicator states are applicable to the at least one physical uplink control channel resource group;

a first indicated transmission configuration indicator state of the two indicated transmission configuration indicator states is applicable to the at least one physical uplink control channel resource group; or a second indicated transmission configuration indicator state of the two indicated transmission configuration indicator states is applicable to the at least one physical uplink control channel resource group.

According to a third aspect there is provided a method comprising, by a terminal device:

receiving a first information element indicating two transmission configuration indicator states;

receiving a configuration; and determining an association between the two indicated transmission configuration indicator states and at least one physical uplink control channel resource group according to the configuration, wherein the configuration causes the terminal device to determine the association between the two indicated transmission configuration indicator states and the at least one physical uplink control channel resource group to be one of the following:

both of the two indicated transmission configuration indicator states are applicable to the at least one physical uplink control channel resource group;

a first indicated transmission configuration indicator state of the two indicated transmission configuration indicator states is applicable to the at least one physical uplink control channel resource group; or a second indicated transmission configuration indicator state of the two indicated transmission configuration indicator states is applicable to the at least one physical uplink control channel resource group.

According to a fourth aspect there is provided a computer program comprising instructions for causing an apparatus to perform at least the following:

receive a first information element indicating two transmission configuration indicator states;

receive a configuration; and determine an association between the two indicated transmission configuration indicator states and at least one physical uplink control channel resource group according to the configuration, wherein the configuration causes the apparatus to determine the association between the two indicated transmission configuration indicator states and the at least one physical uplink control channel resource group to be one of the following:

both of the two indicated transmission configuration indicator states are applicable to the at least one physical uplink control channel resource group;

a first indicated transmission configuration indicator state of the two indicated transmission configuration indicator states is applicable to the at least one physical uplink control channel resource group; or a second indicated transmission configuration indicator state of the two indicated transmission configuration indicator states is applicable to the at least one physical uplink control channel resource group.

According to a fifth aspect there is provided an apparatus comprising at least one processor, and at least one memory including a computer program code, wherein the at least one memory and the computer program code are configured, with the at least one processor, to cause the apparatus to:

transmit, to a terminal device, a first information element indicating two transmission configuration indicator states; and transmit, to the terminal device, a configuration for determining an association between the two indicated transmission configuration indicator states and at least one physical uplink control channel resource group, wherein the configuration causes the terminal device to determine the association between the two indicated transmission configuration indicator states and the at least one physical uplink control channel resource group to be one of the following:

both of the two indicated transmission configuration indicator states are applicable to the at least one physical uplink control channel resource group;

a first indicated transmission configuration indicator state of the two indicated transmission configuration indicator states is applicable to the at least one physical uplink control channel resource group; or a second indicated transmission configuration indicator state of the two indicated transmission configuration indicator states is applicable to the at least one physical uplink control channel resource group.

According to a sixth aspect there is provided an apparatus comprising:

means for transmitting, to a terminal device, a first information element indicating two transmission configuration indicator states; and means for transmitting, to the terminal device, a configuration for determining an association between the two indicated transmission configuration indicator states and at least one physical uplink control channel resource group, wherein the configuration causes the terminal device to determine the association between the two indicated transmission configuration indicator states and the at least one physical uplink control channel resource group to be one of the following:

both of the two indicated transmission configuration indicator states are applicable to the at least one physical uplink control channel resource group;

a first indicated transmission configuration indicator state of the two indicated transmission configuration indicator states is applicable to the at least one physical uplink control channel resource group; or a second indicated transmission configuration indicator state of the two indicated transmission configuration indicator states is applicable to the at least one physical uplink control channel resource group.

According to a seventh aspect there is provided a method comprising, by a network device:

transmitting, to a terminal device, a first information element indicating two transmission configuration indicator states; and transmitting, to the terminal device, a configuration for determining an association between the two indicated transmission configuration indicator states and at least one physical uplink control channel resource group, wherein the configuration causes the terminal device to determine the association between the two indicated transmission configuration indicator states and the at least one physical uplink control channel resource group to be one of the following:

both of the two indicated transmission configuration indicator states are applicable to the at least one physical uplink control channel resource group;

a first indicated transmission configuration indicator state of the two indicated transmission configuration indicator states is applicable to the at least one physical uplink control channel resource group; or a second indicated transmission configuration indicator state of the two indicated transmission configuration indicator states is applicable to the at least one physical uplink control channel resource group.

According to an eighth aspect there is provided a computer program comprising instructions for causing an apparatus to perform at least the following transmit, to a terminal device, a first information element indicating two transmission configuration indicator states; and transmit, to the terminal device, a configuration for determining an association between the two indicated transmission configuration indicator states and at least one physical uplink control channel resource group, wherein the configuration causes the terminal device to determine the association between the two indicated transmission configuration indicator states and the at least one physical uplink control channel resource group to be one of the following:

both of the two indicated transmission configuration indicator states are applicable to the at least one physical uplink control channel resource group;

a first indicated transmission configuration indicator state of the two indicated transmission configuration indicator states is applicable to the at least one physical uplink control channel resource group; or a second indicated transmission configuration indicator state of the two indicated transmission configuration indicator states is applicable to the at least one physical uplink control channel resource group.

LIST OF DRAWINGS

In the following, the invention will be described in greater detail with reference to the embodiments and the accompanying drawings, in which FIG. 1 illustrates an example embodiment of a radio access network.

FIG. 2 illustrates a flow chart according to an example embodiment.

FIG. 3A and FIG. 3B illustrate example embodiments regarding determining an association between at least one TCI state and at least one physical uplink control channel resource group.

DESCRIPTION OF EMBODIMENTS

Figure 1:
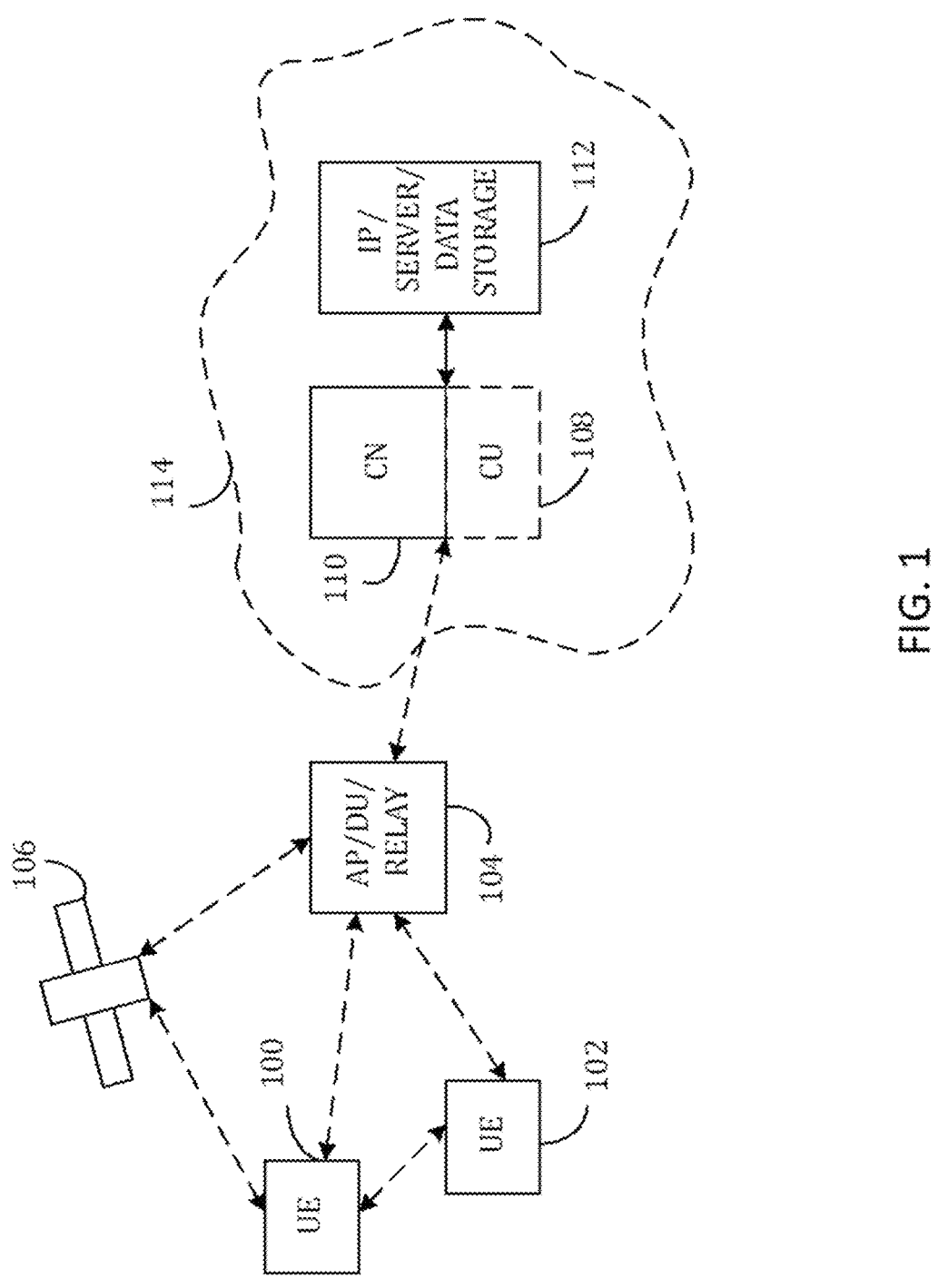

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory (ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FP-GAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g) NodeB) 104 providing the cell. The access node 104 may also be referred to as a node. The wireless link from a terminal device to a (e/g) NodeB is called uplink or reverse link and the wireless link from the (e/g) NodeB to the terminal device is called downlink or forward link. It should be appreciated that (e/g) NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g) NodeB in which case the (e/g) NodeBs may also be configured to communicate with one another over links, wired or wireless, designed for the purpose. These links may be used for signalling purposes. The (e/g) NodeB is a computing device configured to control the radio resources of communication system it is coupled to. The (e/g) NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Satellite communication may utilise geostationary earth orbit (GEO) satellite systems, but also low earth orbit (LEO) satellite systems, for example, mega-constellations. A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized.

It is to be noted that the depicted system is an example of a part of a radio access system and the system may comprise a plurality of (e/g) NodeBs, the terminal device may have an access to a plurality of radio cells and the system may comprise also other apparatuses, such as physical layer relay nodes or other network elements, etc. At least one of the (e/g) NodeBs may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g) NodeBs are required to provide such a network structure.

Uplink control information (UCI) may be provided using physical uplink control channel (PUCCH) as is the case for example in NR. PUCCH may have different formats such as Format 0, 1, 2, 3 and 4, and the different formats may have their respective format configurations in the PUCCH configuration. Different UCI may use different formats, for example, PUCCH Format 0 and 1 may be used for scheduling request (SR) and/or up to two hybrid automatic repeat request acknowledgement (HARQ-ACK) bits. As another example, PUCCH Format 2, 3 and 4 may be used for HARQ-ACK, SR and/or channel state information (CSI). A terminal device may be configured with a number of PUCCH resources according to a PUCCH configuration such as a PUCCH configuration according to a 3GPP specification.

Determining the resources for PUCCH may be based on at least one of the following: PUCCH resources indicator (PRI), in downlink control information (DCI), UCI payload size, control channel element (CCE) index of the physical downlink control channel (PDCCH) carrying the DCI, the total number of CCEs in the control resources set (CORE-SET) on which the PDCCH carrying the DCI has been transmitted, UCI configuration, such as SR configuration, CSI configuration and/or semi-persistent scheduling (SPS) HARQ-ACK configuration. Determining the resources for PUCCH may be performed for example according to a procedure defined in a 3GPP specification.

An operation of signalling spatial relation information for PUCCH may be described as follows: a number of spatial relation information, such as PUCCH-SpatialRelationInfo, may be configured via radio resource control (RRC), such that a selection of one spatial relation is performed via medium access control (MAC) CE. This may also be understood as PUCCH spatial relation Activation/Deactivation MAC CE. The spatial relation update using MAC CE, for example beam switch, may be signalled per PUCCH resource for example. Additionally, it may be possible to have a simultaneous update of a spatial relation per group of PUCCH resources by using one MAC CE, which may also be understood as Enhanced PUCCH spatial relation Activation/Deactivation MAC CE. For example, there may be up to four PUCCH resource groups configured per bandwidth part (BWP). For example, if an indicated PUCCH Resource ID is included in a PUCCH Resource Group of the indicated UL BWP, it may be that no other PUCCH Resources within the same PUCCH Resource group are indicated in the MAC CE, and this MAC CE applies to all the PUCCH Resources in the PUCCH Resource group. In addition, the spatial relation of multiple PUCCH resources may be updated/indicated in the same MAC CE.

Further, a single PUCCH resource may also be used for a multi transmission and reception point (TRP)-operation. As such, a single PUCCH resource may be used for the different time division multiplexed repetitions towards different TRPs. Further, information regarding up to two spatial relations may be indicated and/or activated for a PUCCH resource via MAC CE, for example in frequency range 2 (FR2). Additionally, up to two sets of power control parameters may be indicated and/or activated for a PUCCH resource via MAC CE, for example in frequency range 1 (FR1). A set of power control parameters may comprise for example parameters such as p0, pathloss reference signal (RS) ID, and a closed-loop index.

Transmission configuration indicator (TCI) states may be used to provide quasi colocation assumptions for reception of DL signals and channels, and may also be used for providing spatial sources for the transmission of UL signals and channels. This may be achieved by using a unified TCI framework, which may also be used for defining an indicated TCI state. The indicated TCI state may be for example a joint DL and UL TCI state or separate DL and separate UL TCI states. The indicated TCI state for DL may provide a QCL source for a set of downlink signals and channels and for UL a spatial source for a set of uplink signals and channels.

The unified TCI framework may be utilized for different functionalities. For example, to provide indicated TCI state, which may also be understood as a joint TCI state, for a set of signals and channels at a time. The TCI states, joint and/or separate, may be configured using RRC and up to eight TCI states may be activated via MAC CE. DCI may then indicate one of the activated TCI states to be an indicated TCI state, which may be a joint TCI state. In the unified TCI framework, there may also be multiple indicated DL and/or UL TCI states, in order to cover multi-TRP use cases as well. Further, both single-TRP and multi-TRP PUCCH repetition and/or transmission operations may coexist in the unified TCI framework.

Thus, it is beneficial if a terminal device may determine an association between at least one, for example one or two, TCI states and at least one PUCCH resource group. A PUCCH resource group may be understood to comprise at least one PUCCH resource. A TCI state on the other hand may allow the terminal device to receive more than one DL channels and/or signals and/or transmit more than one UL channels and/or signals using a common beam. The common beam may be indicated by the TCI state. It is also to be noted that a beam, such as an UL beam, may also be understood to refer to spatial relation information; an UL TCI state, which may be a separate UL TCI state; a joint TCI state; a spatial filter; power control information, or power control parameters set; an antenna panel; a quasi-colocation information Type-D or any other type, such as type A, B or C, etc. It is further to be noted that an antenna panel may be identified by an index of corresponding terminal device capability value set or by an antenna panel ID. Alternatively, or additionally, an antenna panel may be identified by, or associated with, at least one reference signal (RS) or an UL beam.

FIG. 2 illustrates a flow chart according to an example embodiment. The flow chart may be a method that is executed for example by an apparatus such as a computing apparatus that may be comprised in a terminal device. In this example embodiment, first, at block S1, a first information element (IE) is received, and the first information element indicates at least one TCI state. In this example embodiment, the first IE is received by a terminal device and the first indication may indicate for example one or two TCI states. Further, the first indication may be received from an access node such as a gNB, via DL DCI using for example format 1_1 or 1_2. The one or two TCI states may be UL TCI states and/or joint TCI states.

Next, in block S2, a second IE is received by the terminal device from the access node. In this example embodiment, the second IE allows the terminal device to derive at least one PUCCH resource group for which the at least one TCI state is applicable. The second IE may, optionally, indicate the at least one PUCCH resource group. The second IE may be provided, by the access node and thus received by the terminal device, in various manners. For example, if the first IE is received via DCI, then the second IE may be received within the same DCI and one IE in the DCI may be dedicated to being the second IE. Optionally, the second IE may comprise a bitmap, wherein the bitmap may indicate the at least one PUCCH resource group for which the at least one TCI state is applicable.

Alternatively, the second IE may be received within the same DCI as the first IE and the second IE may be an IE of the DCI dedicated to another purpose (in other words, dedicated to another purpose than explicitly encoding the PUCCH resource group for which the at least one TCI state is applicable). For example, the second IE may be an IE of the DCI that allows the terminal device to derive the at least one PUCCH resource group for which the at least one TCI state is applicable. For example, the second IE may be an IE of the DCI that allows the terminal device to derive the at least one PUCCH resource group for which the at least one TCI state is applicable. For example, the second IE may indicate at least one PUCCH resource indicator (PRI) and based, at least partly, on that, the terminal device may determine the at least one PUCCH resource group to be the at least one PUCCH resource group to which the at least one PUCCH resource (as identified by the at least one indicated PRI) belongs.

Alternatively, or additionally, the terminal device may determine the at least one PUCCH resource group based on PUCCH resource ID, for example, for PUCCHs that do not have a corresponding PDCCH. In case the terminal device determines the at least one PUCCH resource group implicitly, the terminal device may be configured using for example RRC regarding if the at least one PUCCH resource group is to follow a particular indicated TCI state(s) if the first IE indicates two TCI states. The particular TCI state(s) may be for example one of the following: both indicated TCI states (for example, in case of PUCCH repetition), the first TCI state or the second TCI state. Alternatively, in case the terminal device determines the at least one PUCCH resource group implicitly, the terminal device may associate the at least one indicated TCI state to this at least one PUCCH resource group, i.e., if there is one indicated TCI state or two indicated TCI states, the one indicated TCI or the two indicated TCI states may, respectively, be associated to the at least one PUCCH resource group.

As yet another alternative in block S2, the second indication may be received via dynamic signalling other than the DCI via which the first IE is received.

In block S3 of the flow chart of this example embodiment, an association between the at least one TCI state and the at least one PUCCH resource group is determined by the terminal device. The association is determined, at least partly, based on the second IE as the second IE allows such association to be determined. If one TCI state is indicated, by the first IE, then determining the association comprises determining if the TCI state is to be applied to the at least one PUCCH resource group. If two TCI states are indicated, then determining the association comprises at least determining which of the two indicated TCI states is applicable to which of the at least one PUCCH resource group. For example, if there are two TCI states indicated and there are at least two PUCCH resource groups, then the association determined may be such that one of the TCI states could be applicable to a first PUCCH resource group and the other TCI state could be applicable to a second PUCCH resource group. Thus, in general, determining the association may comprise determining various combinations of TCI states being applicable to various PUCCH resource groups, depending on the amount TCI states indicated and the amount of PUCCH resource groups.

FIG. 3A illustrates an example embodiment, which is also applicable to the example embodiment illustrated in FIG. 2. In this example embodiment the second IE comprises using a bitmap, which allows to determine an association between the indicated at least one TCI state and the at least one PUCCH resource group. It is to be noted that in some example embodiments, the second IE may also indicate the at least one resource group. The bitmap may be transmitted by an access node to a terminal device. In this example embodiment there are three PUCCH resource groups, which may be indexed as #0, #1 and #2 thus referring to the first, second and the third PUCCH resource groups respectively. In this example embodiment, DCI 310, using PDCCH 315, is used to transmit, by the access node to the terminal device, a first IE that indicates two TCI states 332 and 334, also referred to as TCI state #0 and TCI state #1 in FIG. 3A respectively. The DCI 310 is then also used to transmit a second IE that comprises a bitmap based on which the association between the indicated TCI states 332 and 334 and the three PUCCH resource groups #0, #1 and #2 may be determined. The first bit of the bitmap corresponds, in this example embodiment, to the PUCCH resource group #0 that may be considered as a first configured PUCCH resource group. The second bit of the bitmap may correspond to the PUCCH resource group #1 that may be considered as a second configured PUCCH resource group, and the third bit of the bitmap may correspond to the PUCCH resource group #2 that may be considered as a third configured PUCCH resource group. If the bitmap indicates a single '1' and all the other bits are '0', the terminal device may then determine based on the bitmap that the association between the two TCI states and the PUCCH resource groups is such that the two indicated TCI states should be applied to a same PUCCH resource group and the terminal device may then determine the PUCCH resource group based on the index of the '1' bit in the bitmap. For example, if the indicated bitmap is [0 1 0] corresponding to indices [index #0, index #1 index #2] in this case, when two TCI states are indicated, both indicated TCI states should be applied to the second PUCCH resource group, which corresponds to PUCCH resource group #1. Based on the bitmap, the PUCCH repetitions 302 and 304, also referred to as PUCCH rep #0 and PUCCH rep #1 in FIG. 3A respectively, which use a PUCCH resource belonging to PUCCH resource group #1, are then performed, in a multi-TRP use case, using both indicated TCI states.

Alternatively, or additionally, DCI 320, using PDCCH 325 may be used to transmit, by the access node to the terminal device, a first IE that indicates two TCI states 332 and 334 and a second IE that comprises another, different bitmap for allowing another association to be determined. In this alternative, the bitmap indicates two '1's and the other bits in the bitmap are '0', and thus the terminal device may determine that the association between the two TCI states 332 and 334 and the PUCCH resource groups #0, #1 and #2 is such that the two indicated TCI states should be applied to two PUCCH resource groups. The terminal device may then determine the two PUCCH resource groups based on the indexes of the '1' bits in the bitmap. For example, if the indicated bitmap is [1 0 1] corresponding to indices [index #0, index #1 index #2], and if two TCI states are indicated, then the indicated first and second TCI states 332 and 334 should be applied to the first PUCCH resource group, which corresponds to the PUCCH resource group #0, and to the third PUCCH resource group, which corresponds to the PUCCH resource group #2, respectively. The PUCCH transmission 306, which uses a PUCCH resource belonging to PUCCH resource group #2, may then be transmitted using the second TCI state 334.

Although in this example embodiment there are two TCI states indicated, alternatively there could be one TCI state that is indicated using the first IE. Then, if a bitmap is used for determining the association between the TCI state and the PUCCH resource groups, the PUCCH resource groups that are to be associated with the TCI state are the ones that have indices corresponding to the bits '1' in the bitmap. Thus, in general, a bit in the bitmap may correspond to both a TCI state and to a PUCCH resource group and the terminal device may determine that the TCI state is applicable to the PUCCH resource group if the value of the bit has a predetermined value, such as value 1, and that the TCI is not applicable to the PUCCH resource group if the value of the bit is 0 for-example. It is to be noted though that one bit may correspond to more than one TCI states and/or more than one PUCCH resource groups and the value of the bit may then determine the association between the TCI state(s) and the PUCCH resource group(s).

It is also to be noted that the size of the bitmap may be equal to the total number of configured PUCCH resource groups or, alternatively, the size of the bitmap may be shorter than the total number of configured PUCCH resource groups. This may be the case for example if there is a selection of a number of PUCCH resource groups lower than the total number of configured PUCCH resource groups.

FIG. 3B illustrates an example embodiment, which may be applicable also to the example embodiment illustrated in FIG. 2. This example embodiment comprises using implicit indication of the at least one PUCCH resource group and in this example embodiment there are three PUCCH resource groups, which may be indexed as #0, #1 and #2 thus referring to the first, second and the third PUCCH resource groups respectively. In this example embodiment, DCI 340, using PDCCH 345, is used to transmit, by the access node to the terminal device, a first IE that indicates two TCI states 372 and 374, also referred to as TCI state #0 and TCI state #1 in FIG. 3B respectively. The second IE in this example embodiment allows the terminal device to determine the association between the indicated two TCI states 372 and 374 and the PUCCH resource groups #0, #1 and #2.

In this example embodiment, the terminal device may be configured, using RRC for example, to determine the PUCCH resource groups #0, #1 and #2 to follow a particular indicated TCI state. The particular TCI state, in this example embodiment, may be one of the following: two indicated TCI states 372 and 374, the first indicated TCI state 372 or the second indicated TCI state 374. This configuration that is received by the terminal device via RRC may be understood as a pre-configuration. In this example embodiment, the terminal device is pre-configured such that the PUCCH resource group #0 is to follow the particular TCI state which for the PUCCH resource group #0 is the two TCI states indicated by the DCI. It is to be noted though that when the pre-configuration is received, by the terminal device, the identities of the TCI states may not be known to the terminal device as the terminal device has not yet received the first IE that indicates the identities of the TCI states. Thus, when the first IE transmitted using the DCI 340 indicates the two TCI states 372 and 374 for UL transmissions, the terminal device determines the association between the indicated two TCI states and the PUCCH resource group #0 to be such that both TCI states 372 and 374 are to be applied to the PUCCH resource group #0.

Thus, in this example embodiment, the PUCCH repetitions 362 and 364, also referred to as PUCCH rep #0 and PUCCH rep #1 in FIG. 3B respectively, which use a PUCCH resource belonging to PUCCH resource group #0, are then performed, in a multi-TRP use case, using the first and second indicated TCI states.

Further, in this example embodiment, the terminal device is pre-configured such that the PUCCH resource group #1 is to follow the particular TCI state which for the PUCCH resource group #1 is the first TCI state of the two TCI states indicated by the DCI. Yet, it is again to be noted though that when the pre-configuration is received, by the terminal device, the identities of the TCI states may not be known to the terminal device as the terminal device has not yet received the first IE that indicates the identities of the TCI states. Thus, when the first IE transmitted using the DCI 340 indicates the two TCI states 372 and 374 for UL transmissions, the terminal device determines the association between the indicated two TCI states 372 and 374 and the PUCCH resource group #1 to be such that the first TCI state 372 is to be applied to the PUCCH resource group #1. Thus, the second TCI state 374 of the two indicated TCI states is not applied to the resource group #1 in this example embodiment.

Further, in this example embodiment, the terminal device is pre-configured such that the PUCCH resource group #2 is to follow the particular TCI state which for the PUCCH resource group #2 is the second TCI state of the two TCI states indicated by the DCI. Yet, it is again to be noted though that when the pre-configuration is received, by the terminal device, the identities of the TCI states may not be known to the terminal device as the terminal device has not yet received the first IE that indicates the identities of the TCI states. Thus, when the first IE transmitted using the DCI 340 indicates the two TCI states 372 and 374 for UL transmissions, the terminal device determines the association between the indicated two TCI states 372 and 374 and the PUCCH resource group #2 to be such that the second TCI state 374 is to be applied to the PUCCH resource group #2. Thus, the first TCI state 372 of the two indicated TCI states is not applied to the resource group #2 in this example embodiment.

Alternatively, or additionally, DCI 350, using PDCCH 355, may be used to transmit, by the access node to the terminal device, the first IE that indicates one TCI state that is to be used for UL transmission. The one TCI state in this example embodiment is the TCI state 376, which is also referred to as TCI state #3 in the FIG. 3B. The terminal device may then determine the association between the three PUCCH resource groups #0, #1 and #2 and the TCI state 376 based, at least partly on the received pre-configuration. Thus, in this example embodiment, for the PUCCH resource group #0 the terminal device may determine the association to be such that the TCI state 376 is applicable to the PUCCH resource group #0 or that the TCI state 376 is not applicable to the PUCCH resource group #0. Also, for the PUCCH resource group #1 the terminal device may determine the association to be such that the TCI state 376 is applicable to the PUCCH resource group #1 or that the TCI state 376 is not applicable to the PUCCH resource group #1. Then for the PUCCH resource group #2 the terminal device may determine the association to be such that the TCI state 376 is applicable to the PUCCH resource group #2 or that the TCI state 376 is not applicable to the PUCCH resource group #2. It is to be noted that the terminal device then applies a TCI state to a PUCCH resource group if it is determined to be applicable. Thus, in this example embodiment, for the PUCCH transmission 366, PUCCH resource comprised in the PUCCH resource group #1 is utilized with TCI state 376.

In general, it is to be noted that once the terminal device has determined an association between the indicated TCI states and the PUCCH resource groups, the terminal device has determined which TCI states, and also how many, one or two for example, TCI states, are associated with a PUCCH resource group. Thus, the terminal device may utilize the one or two TCI states associated with the PUCCH resource group for a PUCCH transmission or repetition. Also, an indicated TCI state may be an UL TCI state or a joint TCI state.

It is also to be noted that in the example embodiments described above, determining the association may also be applicable to CORESETs on a per PUCCH resource group basis for example such that PUCCH resource group may be identified using certain CORESETPool index. For example, one or more PUCCH resources, which may be comprised in one or more PUCCH resource groups, may be associated, for example, to different TRPs and/or associated to different CORESETPool indexes and/or associated to different PCIs (physical cell IDs), such as CORESETPool index #0 and CORESETPool index #1. As such, if the terminal device receives, from an access node, indications of one or more TCI states, such as UL and/or joint TCI states, via an IE in DCI transmitted using a PDCCH that is transmitted over a CORESET belonging to one CORESETPool index, for instance CORESETPool index #0, the terminal device may apply or restrict the operations described above to the PUCCH resource groups associated to this CORESETPool index.

It is also noted that, in some embodiments, if a one (UL or joint) TCI state is indicated or applicable for a given CORESET group or PCI, a PUCCH transmission operation scheduled by a PDCCH sent over resources belonging to this CORESET group, the terminal device may determine to apply the one TCI state to this PUCCH transmission. On the other hand, in some other embodiments, if two (UL and/or joint) TCI states are indicated or applicable for a given CORESET group or PCI, for a multi-TRP PUCCH transmission/repetition operation scheduled by a PDCCH sent over resources belonging to this CORESET group, the terminal device may determine to apply the two TCI states to this PUCCH transmission/repetition operation. It is also noted that, if a PUCCH transmission operation, be it single-TRP or multi-TRP, is scheduled by a PDCCH that is repeated using two PDCCH candidates belonging to different CORESETs or CORESET groups or CORESETPool Indexes or PCIs, for the embodiments described above, the user device may assume that the PDCCH candidate corresponding to the CORESET or CORESET group or CORESETPool Index or PCIs or search space set with lower/ higher index as the reference PDCCH candidate. In this case, the TCI state determination described for the example embodiments above, may be based on the CORESET group or PCI that corresponds to the reference PDCCH candidate.

It is also to be noted that one or more PUCCH resource group may be associated to a capability value set and/or antenna panel. Then, when at least one capability value set becomes applicable, the terminal device may apply the corresponding one or more indicated TCI states to the associated one or more PUCCH resource groups. It is further to be noted that the multi-TRP operation, such as PUCCH repetition and/or transmission using two TCI states, that may be UL TCI states, may be with simultaneous or parallel or Time Division Multiplexed PUSCH transmissions and/or repetitions.

The example embodiments described above may have benefits such as enabling support for a multi-TRP PUCCH repetition and/or transmission operation considering the unified TCI framework and allowing both single-TRP and multi-TRP PUCCH repetition and/or transmission operations to coexist under the TCI framework. As downlink DCI may provide a terminal device with information that can be used to determine an association between for example one or two indicated TCI states and one or more PUCCH resource groups, this may allow the TCI framework to support both s-TRP and m-TRP UL operations without complicated signalling needs.

Figure 4:
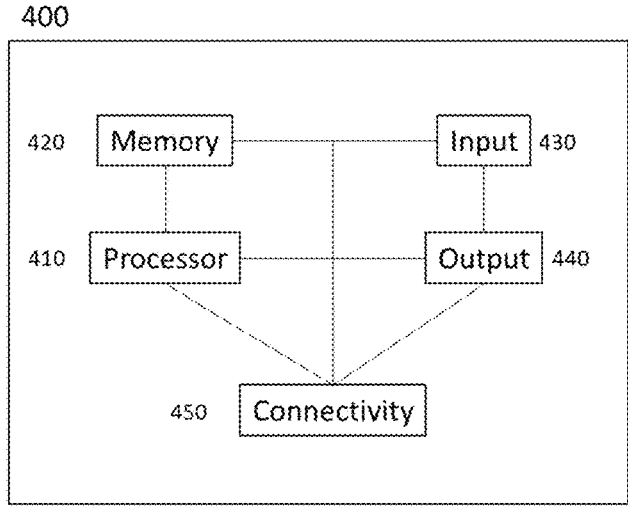
FIG. 4 and FIG. 5 illustrate example embodiments of an apparatus.

FIG. 4 illustrates an apparatus 400, which may be an apparatus such as, or comprised in, a terminal device, according to an example embodiment. The apparatus 400 comprises a processor 410. The processor 410 interprets computer program instructions and processes data. The processor 410 may comprise one or more programmable processors. The processor 410 may comprise programmable hardware with embedded firmware and may, alternatively or additionally, comprise one or more application specific integrated circuits, ASICs.

The processor 410 is coupled to a memory 420. The processor is configured to read and write data to and from the memory 420. The memory 420 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 420 stores computer readable instructions that are execute by the processor 410. For example, non-volatile memory stores the computer readable instructions and the processor 410 executes the instructions using volatile memory for temporary storage of data and/or instructions.

The computer readable instructions may have been pre-stored to the memory 420 or, alternatively or additionally, they may be received, by the apparatus, via electromagnetic carrier signal and/or may be copied from a physical entity such as computer program product. Execution of the computer readable instructions causes the apparatus 400 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 400 further comprises, or is connected to, an input unit 430. The input unit 430 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 430 may comprise an interface to which external devices may connect to.

The apparatus 400 also comprises an output unit 440. The output unit comprises or is connected to one or more displays capable of rendering visual content such as a light emitting diode, LED, display, a liquid crystal display, LCD and a liquid crystal on silicon, LCOS, display. The output unit 440 further comprises one or more audio outputs. The one or more audio outputs may be for example loudspeakers or a set of headphones.

The apparatus 400 may further comprise a connectivity unit 450. The connectivity unit 450 enables wired and/or wireless connectivity to external networks. The connectivity unit 450 may comprise one or more antennas and one or more receivers that may be integrated to the apparatus 400 or the apparatus 400 may be connected to. The connectivity unit 450 may comprise an integrated circuit or a set of integrated circuits that provide the wireless communication capability for the apparatus 400. Alternatively, the wireless connectivity may be a hardwired application specific integrated circuit, ASIC.

It is to be noted that the apparatus 400 may further comprise various component not illustrated in the FIG. 4. The various components may be hardware component and/or software components.

Figure 5:
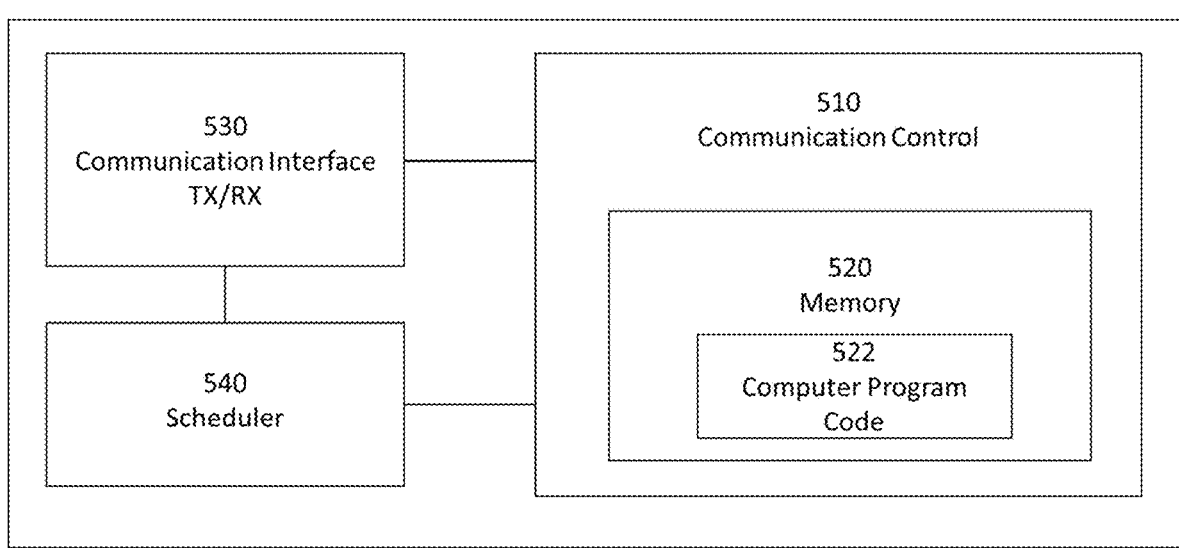

The apparatus 500 of FIG. 5 illustrates an example embodiment of an apparatus that may be an access node or be comprised in an access node. The apparatus may be, for example, a circuitry or a chipset applicable to an access node to realize the described embodiments. The apparatus 500 may be an electronic device comprising one or more electronic circuitries. The apparatus 500 may comprise a communication control circuitry 510 such as at least one processor, and at least one memory 520 including a computer program code (software) 522 wherein the at least one memory and the computer program code (software) 522 are configured, with the at least one processor, to cause the apparatus 500 to carry out any one of the example embodiments of the access node described above.

The memory 520 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 500 may further comprise a communication interface 530 comprising hardware and/or software for realizing communication connectivity according to one or more communication protocols. The communication interface 530 may provide the apparatus with radio communication capabilities to communicate in the cellular communication system. The communication interface may, for example, provide a radio interface to terminal devices. The apparatus 500 may further comprise another interface towards a core network such as the network coordinator apparatus and/or to the access nodes of the cellular communication system. The apparatus 500 may further comprise a scheduler 540 that is configured to allocate resources.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The following exemplary embodiments for a terminal device are also disclosed.

Example 1: An apparatus comprising at least one processor, and at least one memory including a computer program code, wherein the at least one memory and the computer program code are configured, with the at least one processor, to cause the apparatus to:

receive a first information element, wherein the first information element indicates at least one transmission configuration indicator state;

receive a second information element; and determine, based on the second information element, an association between the at least one transmission configuration indicator state and at least one physical uplink control channel resource group.

Example 2: The apparatus of example 1, wherein the second information element indicates at least one physical uplink control channel resource indicator.

Example 3: The apparatus of example 1 or 2, wherein the apparatus is further caused to:

determine the association between the at least one transmission configuration indicator state and the at least one physical uplink control channel resource group according to a pre-configuration.

Example 4: The apparatus of example 3, wherein the first information element indicates two transmission configuration indicator states, and wherein the pre-configuration causes the apparatus to determine the association between the two transmission configuration indicator states and the at least one physical uplink control channel resource group to be one of the following:

both of the two transmission configuration indicator states are applicable to the at least one physical uplink control channel resource group;

a first transmission configuration indicator state of the two transmission configuration indicator states is applicable to the at least one physical uplink control channel resource group; or a second transmission configuration indicator state of the two transmission configuration indicator states is applicable to the at least one physical uplink control channel resource group.

Example 5: The apparatus of any of examples 1-4, wherein the second information element comprises a bitmap.

Example 6: The apparatus of example 5, wherein a bit in the bitmap corresponds to a transmission configuration indicator state that is comprised in the at least one transmission configuration state, and to a physical uplink control channel resource group that is comprised in the at least one physical uplink control channel resource group, and wherein the apparatus is further caused to determine that the transmission configuration indicator state is applicable to the physical uplink control channel resource group if the value of the bit has a pre-determined value.

Example 7: The apparatus of any of examples 1 to 6, wherein the first information element and the second information element are comprised in a downlink control information.

Example 8: The apparatus of any of examples 1 to 7, wherein the apparatus is further caused to:

transmit a physical uplink control channel transmission according to the determined association between the at least one transmission configuration indicator state and the at least one physical uplink control channel resource group.

The following exemplary embodiments for a network device are also disclosed.

Example 9: An apparatus comprising at least one processor, and at least one memory including a computer program code, wherein the at least one memory and the computer program code are configured, with the at least one processor, to cause the apparatus to:

transmit, to a terminal device, a first information element, wherein the first information element indicates at least one transmission configuration indicator state; and transmit, to the terminal device, a second information element, wherein the second information element is for determining an association between the at least one transmission configuration indicator state and at least one physical uplink control channel resource group.

Example 10: The apparatus of example 9, wherein the first information element and the second information element are transmitted using downlink control information.

Example 11: The apparatus of example 9 or 10, wherein the second information element indicates a physical uplink control channel resource indicator, and wherein the apparatus is further caused to:

transmit, to the terminal device, and prior to transmitting the first information element, a pre-configuration for determining the association between the at least one transmission configuration indicator state and the at least one physical uplink control channel resource group.

The following exemplary embodiment for a method to be performed by a terminal device is also disclosed.

Example 12: A method comprising, by a terminal device:

receiving a first information element, wherein the first information element indicates at least one transmission configuration indicator state;

receiving a second information element; and determining, based on the second information element, an association between the at least one transmission configuration indicator state and at least one physical uplink control channel resource group.

The following exemplary embodiment for a method to be performed by a network device is also disclosed.

Example 13: A method comprising, by a network device:

transmitting, to a terminal device, a first information element, wherein the first information element indicates at least one transmission configuration indicator state; and transmitting, to the terminal device, a second information element, wherein the second information element is for determining an association between the at least one transmission configuration indicator state and at least one physical uplink control channel resource group.

The following exemplary embodiments for a computer program are also disclosed.

Example 14: A computer program comprising instructions for causing an apparatus to perform at least the following:

receive a first information element, wherein the first information element indicates at least one transmission configuration indicator state;

receive a second information element; and determine, based on the second information element, an association between the at least one transmission configuration indicator state and at least one physical uplink control channel resource group.

Example 15: A computer program comprising instructions for causing an apparatus to perform at least the following:

transmit, to a terminal device, a first information element, wherein the first information element indicates at least one transmission configuration indicator state; and transmit, to the terminal device, a second information element, wherein the second information element is for determining an association between the at least one transmission configuration indicator state and at least one physical uplink control channel resource group.

The invention claimed is:

1. An apparatus comprising at least one processor, and at least one memory including a computer program code, wherein the at least one memory and the computer program code are configured, with the at least one processor, to cause the apparatus to:

receive a pre-configuration;

receive, in a downlink control information, a first information element indicating two transmission configuration indicator states;

and determine an association between the two indicated transmission configuration indicator states and a physical uplink control channel resource group according to the pre-configuration, wherein the pre-configuration causes the apparatus to determine the association between the two indicated transmission configuration indicator states and the physical uplink control channel resource group to be:

both of the two indicated transmission configuration indicator states are applicable to the physical uplink control channel resource group in response to a first configuration;

a first indicated transmission configuration indicator state of the two indicated transmission configuration indicator states is applicable to the physical uplink control channel resource group in response to a second configuration; and a second indicated transmission configuration indicator state of the two indicated transmission configuration indicator states is applicable to the physical uplink control channel resource group in response to a third configuration.

2. The apparatus of claim 1, wherein the apparatus is further caused to:

receive a second information element; and derive the physical uplink control channel resource group based on the second information element.

3. The apparatus of claim 2, wherein the second information element indicates a physical uplink control channel resource indicator.

4. The apparatus of claim 2, wherein the second information element is comprised in the downlink control information.

5. The apparatus of claim 1, wherein the apparatus is further caused to perform a physical uplink control channel transmission according to the determined association between the two indicated transmission configuration indicator states and the physical uplink control channel resource group.

6. The apparatus of claim 1, wherein the pre-configuration is received via radio resource control signaling.

7. An apparatus comprising at least one processor, and at least one memory including a computer program code, wherein the at least one memory and the computer program code are configured, with the at least one processor, to cause the apparatus to:

transmit to a terminal device, a pre-configuration; and
transmit, to the terminal device, using a downlink control information, a first information element indicating two transmission configuration indicator states,
wherein the pre-configuration is for causing the terminal device to determine an association between the two indicated transmission configuration indicator states and the physical uplink control channel resource group to be:

both of the two indicated transmission configuration indicator states are applicable to the physical uplink control channel resource group in response to a first configuration;
a first indicated transmission configuration indicator state of the two indicated transmission configuration indicator states is applicable to the physical uplink control channel resource group in response to a second configuration; and
a second indicated transmission configuration indicator state of the two indicated transmission configuration indicator states is applicable to the physical uplink control channel resource group in response to a third configuration.

8. The apparatus of claim 7, wherein the apparatus is further caused to:

transmit, to the terminal device, a second information element for deriving the physical uplink control channel resource group.

9. The apparatus of claim 8, wherein the second information element indicates a physical uplink control channel resource indicator.

10. The apparatus of claim 8, wherein the second information element is transmitted using the downlink control information.

11. The apparatus according to claim 7, wherein the transmitting, to the terminal device, the pre-configuration comprises:

transmitting the pre-configuration via radio resource control signaling.

12. A method comprising, by a terminal device:
receiving a pre-configuration;
receiving, in a downlink control information, a first information element indicating two transmission configuration indicator states;
and
determining an association between the two indicated transmission configuration indicator states and a physical uplink control channel resource group according to the pre-configuration,
wherein the pre-configuration causes the terminal device to determine the association between the two indicated transmission configuration indicator states and the physical uplink control channel resource group to be:
both of the two indicated transmission configuration indicator states are applicable to the physical uplink control channel resource group in response to a first configuration;
a first indicated transmission configuration indicator state of the two indicated transmission configuration indicator states is applicable to the physical uplink control channel resource group in response to a second configuration; and
a second indicated transmission configuration indicator state of the two indicated transmission configuration indicator states is applicable to the physical uplink control channel resource group in response to a third configuration.

13. The method of claim 12, further comprising:
receiving a second information element; and
deriving the physical uplink control channel resource group based on the second information element.

14. The method of claim 13, wherein the second information element indicates a physical uplink control channel resource indicator.

15. The method of claim 13, wherein the second information element is comprised in the downlink control information.

16. The method of claim 12, further comprising:
performing a physical uplink control channel transmission according to the determined association between the two indicated transmission configuration indicator states and the physical uplink control channel resource group.

* * * * *